United States Patent [19]

Nitsche

[11] Patent Number: 5,762,981
[45] Date of Patent: Jun. 9, 1998

[54] BASE FOR A MOLD ASSEMBLY

[75] Inventor: Reinhold Ernst Nitsche, Caledonia, Canada

[73] Assignee: Wentworth Mould and Die Company Limited, Hamilton, Canada

[21] Appl. No.: 709,812

[22] Filed: Sep. 10, 1996

[51] Int. Cl.$^6$ .................................................. B29C 49/48
[52] U.S. Cl. ........................ 425/822; 249/79; 425/526
[58] Field of Search ................................ 425/522, 183, 425/532, 526; 249/102, 103, 104, 79

[56] References Cited

U.S. PATENT DOCUMENTS

| Re. 30,215 | 2/1980 | Kuenzig et al. | 425/525 |
|---|---|---|---|
| 3,733,384 | 5/1973 | Gerlovich et al. | 425/532 |
| 3,843,286 | 10/1974 | Horberg, Jr. et al. | 425/526 |
| 3,907,475 | 9/1975 | Bowers | 425/526 |
| 4,032,278 | 6/1977 | Kuenzig et al. | 425/525 |
| 5,255,889 | 10/1993 | Collette et al. | 249/102 |
| 5,383,777 | 1/1995 | Pace | 425/192 R |

FOREIGN PATENT DOCUMENTS

| 1153522 | 9/1983 | Canada . | |
|---|---|---|---|
| 1214011 | 11/1986 | Canada . | |
| 1238462 | 6/1988 | Canada . | |
| 2139741 | 1/1994 | Canada . | |
| 2143036 | 9/1995 | Canada . | |
| 2082350 | 11/1995 | Canada . | |
| 3134474 | 3/1983 | Germany | 425/522 |
| 4-101813 | 4/1992 | Japan | 425/526 |
| 864739 | 4/1961 | United Kingdom | 425/526 |

Primary Examiner—Robert Davis

[57] ABSTRACT

A base assembly for use as a part of a mold assembly for making containers comprises an adaptor, a base insert (or base plug), and a wear ring. The base insert is made from aluminum and has a lower surface positioned on a flat upper supporting surface of the adaptor. The base insert has an upper surface with a ledge surrounding a recessed contoured pattern in the base insert which pattern corresponds to a base of the container to be formed. The base insert has an annular side wall portion. The wear ring has an inner annular surface surrounding and engaging the annular side wall portion of the base insert to protect the annular side wall portion. The wear ring comprises a hardened wear resistant steel ring adapted to reinforce the base insert during formation of the container. The base insert and wear ring are secured to the adaptor by threaded fasteners that pass through threaded apertures in the adaptor, the base insert and the wear ring. By using an aluminum base insert the mass or weight of the base assembly is reduced and the heat transfer characteristics of the base assembly are improved reducing container forming cycle time. Further, the wear ring can be hardened by heat treatment which increases the strength of the wear ring above that of steel base inserts eliminating the need for stellite welding to reinforce the base insert.

20 Claims, 4 Drawing Sheets

BASE FOR A MOLD ASSEMBLY

TECHNICAL FIELD OF THE INVENTION

The present invention relates to modular molds for making containers, and more particularly to a base assembly forming part of the modular mold.

BACKGROUND OF THE INVENTION

Mold assemblies comprising two side mold parts and a base mold part are commonly used in the formation of plastic containers such as, for example, biaxially-oriented PET (polyethylene terephthalate) beverage bottles. With respect to the base part of the mold assembly, the base part is typically manufactured from a steel adaptor and a cast steel or cut steel base insert that is inserted into the mold assembly. The base insert is formed with the base mold face in a pattern for the bottle to be formed. The adaptor is typically a cylindrical shaped plate to which the base insert is secured by threaded screws or bolts. The bolts pass through threaded apertures in the adaptor and into threaded apertures in the base insert. Fluid circulating passages are provided in the adaptor and the base insert to assist in the cooling of the base mold part during the formation of the bottle. The adaptor and base insert are typically made from a durable steel product so that they can withstand the stresses of the molding process in the formation of the bottle and have a long life. The adaptor rests on a pedestal to support the base insert during the forming process and during movement of the base insert and formed container along the cam to the next work station for the bottle. The weight of the base part of the mold is in the order of 8 pounds which over extended periods of use has a wearing effect on the cam. The extent of the wearing may be better appreciated when one considers that all base assemblies can move along the cam at rates of 1000 times per hour. Further, if the heat transfer characteristics of the steel used in the base insert could be enhanced, then the bottle formation cycle time could be reduced leading to increased container production. Also, during manufacture of the base assembly, the base insert upper outside edges are reinforced by stellite welding which is a highly wear resistant weld that strengthens the insert during the closing of the mold pieces. The disadvantage with the stellite weld is that is an expensive step in the manufacturing process of the base assembly.

SUMMARY OF THE INVENTION

The present invention relates a base assembly used as a part of mold assembly used to form a container. The base assembly includes a light weight base insert, preferably made from aluminum, having an upper surface containing the pattern of the base of the container to be formed. The base assembly further includes a wear ring, made from a hardened steel, that surrounds the base insert to protect and add strength to the light weight base assembly.

By using a lightweight basis insert, together with a hardened wear ring, the present invention has the advantages of: allowing for interchangeable base assembly parts of the wear ring and base insert; eliminating the stellite welding step in manufacture of the base insert around the top and edges of the base insert to provide reinforcement of the base insert; the light weight material is also a soft material that may be more easily worked to form a pattern therein; the use of the aluminum provides an improved heat transfer material than previously used steel which reduces cycle formation time and increases container production; and, the weight of the base assembly can be reduced by as much as 40% (from about 8 pounds to 5 pounds) when aluminum is used which results in a base assembly has less of an impact on the wear and tear of the cam systems used in the formation of containers.

It should be understood that the use of the term base insert (base plug) as used throughout the specification and claims refers to the function of the base insert as a die part in the mold to shape the base of the container during the formation of the container. An upper surface is defined for the base insert that is contoured to have the shape of the container being formed. It should be understood that the upper surface of the base insert may be a recessed generally concave shape forming a cavity insert, or the upper surface of the base insert may be a projecting generally convex shape forming a push up insert.

In accordance with one aspect of the present invention there is provided a base assembly for use as a part of a mold assembly for forming containers. The base assembly comprises a generally cylindrical shaped adaptor having an upper supporting surface. The base assembly further includes a base insert having a lower surface positioned on the upper supporting surface of the adaptor. The base insert has an upper surface contoured to the shape of a base of the container to be formed. The base insert has at least one annular side wall portion and the base insert comprises a lightweight metallic material. The base assembly includes a wear ring having an inner annular surface surrounding and engaging the at least one annular side wall portion of the base insert to protect the at least one annular side wall portion of the base insert and to reinforce the base insert during formation of the container. In addition, the base assembly includes a plurality of fasteners passing through the adaptor to positively locate and secure the base insert and the wear ring relative to the adaptor.

Preferably, the wear ring is heat treated to be a hardened steel ring that is slip fitted around the base insert. The wear ring has an outer wall portion that is adapted to co-operate with other mold parts of the mold assembly during formation of the container. The outer wall of the wear ring is preferably provided with a recessed groove and rim to co-operate with the other mold parts during formation of the container. Preferably, the rim has an upper edge that is flush to the upper edge of the base insert.

BRIEF DESCRIPTION OF THE DRAWINGS

A more complete understanding of the apparatus of the present invention may be obtained by reference to the following detailed description when taken in conjunction with the accompanying diagrammatic drawings wherein.

DETAILED DESCRIPTION OF EMBODIMENTS

Figure 1:
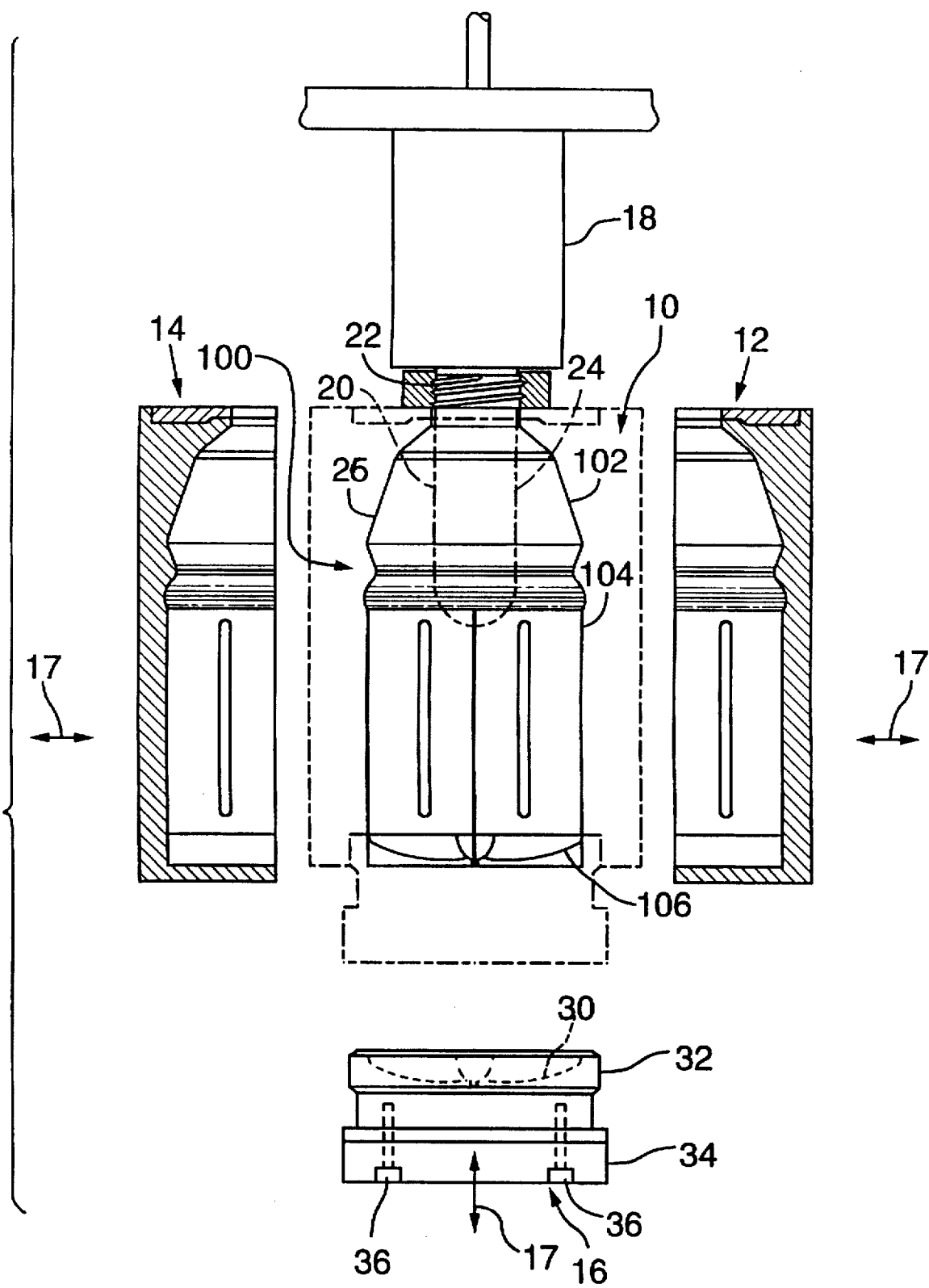
FIG. 1 is a schematic partially in section view of a formed bottle and three separated mold members where both the preform and closed mold members shown in phantom.

Referring to the drawings the embodiments of the present invention are described. While the mold apparatus described herein is adapted for making a hot fill PET bottle, it should be understood that the mold apparatus shown can be used for other types of containers when the mold face is changed, such as for example, soft drinks, juices, cleansers, and detergent type containers to name a few.

In FIG. 1, the bottle 100 is made from a preform 20 having a thread finish 22 attached to carrier 18 and a lower tube portion 24 which is blown into a bottle shape in a mold 10. During blowing the preform assumes the shape of the interior molding surface 26 of the mold to form an upper shoulder portion 102, a middle label panel portion 104, and a base 106. The upper shoulder 102 flares radially outwardly from the relatively narrow tube portion 24 to the label panel 104.

The modular mold assembly shown in FIG. 1 includes three movable mold parts 12, 14, and 16 which come together as indicated by the arrows 17 to form the closed mold shown in phantom around preform 20. The upper right and left half mold parts 12 and 14 respectively are mirror images and move horizontally to close. The third mold part comprises the light weight base assembly 16 of the present invention which moves vertically to fit within a base receiving portion of the parts 12 and 14.

The base assembly 16 comprises an aluminum base insert 30, a steel hardened wear ring 32, and a adaptor 34. The three component parts 30, 32, and 34 are secured together by threaded fasteners or bolts 36.

Figure 2:
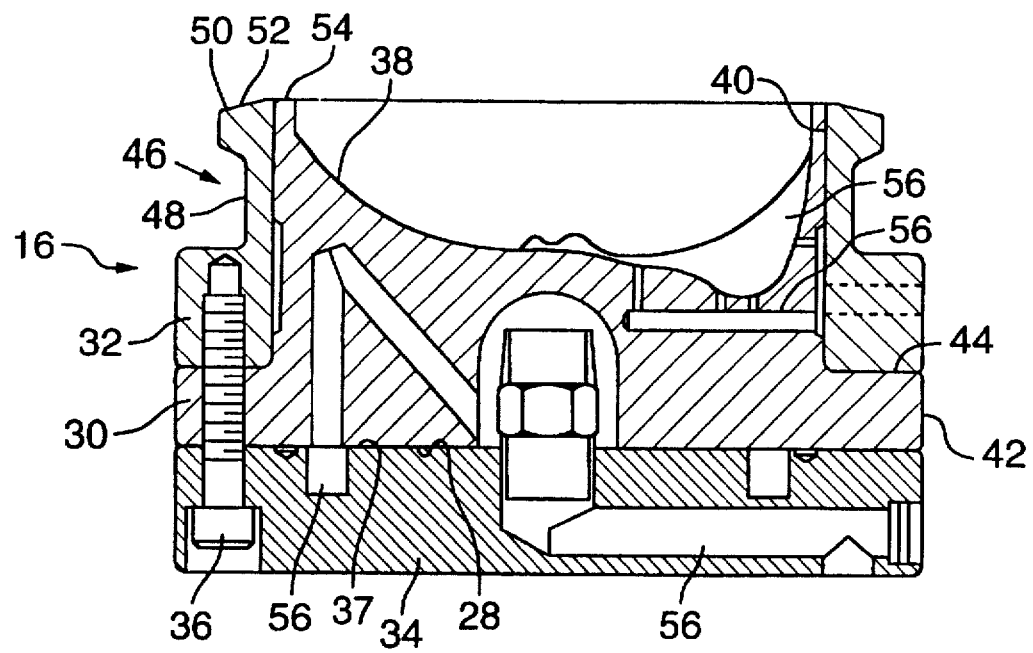
FIG. 2 is a schematic partially in section view of one embodiment of the base assembly of the present invention.

Referring to FIGS. 2 rind 3 one of the embodiments of the base assembly 16 of the present invention is shown. In this embodiment, the base insert 30 rests directly on top of the adaptor 34. The base insert 30 has a lower surface 37 positioned on the upper supporting surface 28 of the adaptor. The base insert 30 includes an upper surface 38 contoured to the shape of a base of the container to be formed. In this embodiment, the base insert upper surface 38 is generally concave in shape and is commonly referred to as a "cavity insert". The base insert has upper and lower annular side wall portions 40 and 42 respectively. The lower annular side wall portion 42 is closer to the adaptor than the upper annular side wall portion 44. The lower annular side wall portion 42 has a larger diameter than the upper annular side wall portion 40 such that the lower annular side wall portion 40 provides a stepped out peripheral flange 44 upon which the wear ring 32 is positioned such that the wear ring 32 surrounds and engages the upper annular side wall portion 40.

Figure 3:
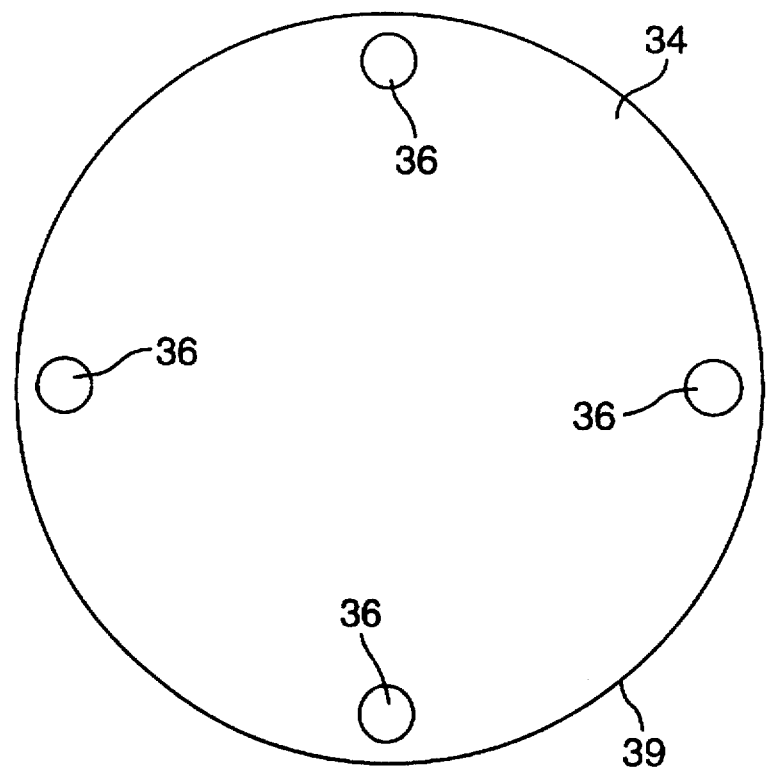
FIG. 3 is a bottom end view of the base assembly shown in FIG. 2.

The threaded fasteners 36 pass through threaded apertures in the adaptor 34 and flange part 44, or shoulder 44, of the base insert 30 and into the wear ring 32 to secure the adaptor 34, the base insert 30 and the wear ring 32 together with the peripheral flange 44 of the base insert 30 sandwiched between the wear ring 32 and the adaptor 34. In FIG. 3 the fasteners 36 are evenly spaced adjacent to and around the periphery 39 of the adaptor 34.

The wear ring 32 is a hardened steel ring that is slip fitted around upper annular side wall portion 40 base insert 30. The wear ring 32 has an outer wall portion 46 that is adapted to co-operate with other mold parts 12 and 14 (FIG. 1) of the mold assembly 10 during formation of the container 100. The outer wall portion 46 of the wear ring is preferably provided with a recessed groove 48 and a rim 50 so as to co-operate with the other mold parts during formation of the container. Preferably, the rim 50 has an upper edge 52 that is either flush to or below the upper edge 54 of the base insert 30. The use of the wear ring 32 reinforces the softer and lighter base insert 38 during the formation of the container and eliminates the need for stellite welding to increase the strength of the base insert 30.

The adaptor 34 and the base insert 30 are provided with cooling passages 56 thoughwhich coolant flows during the cool down cycle of the formation of the container 100. The speed of the cool down cycle for the base insert is reduced since the base insert 30 is made from aluminum which has superior heat transfer properties to that of steel.

Figure 4:
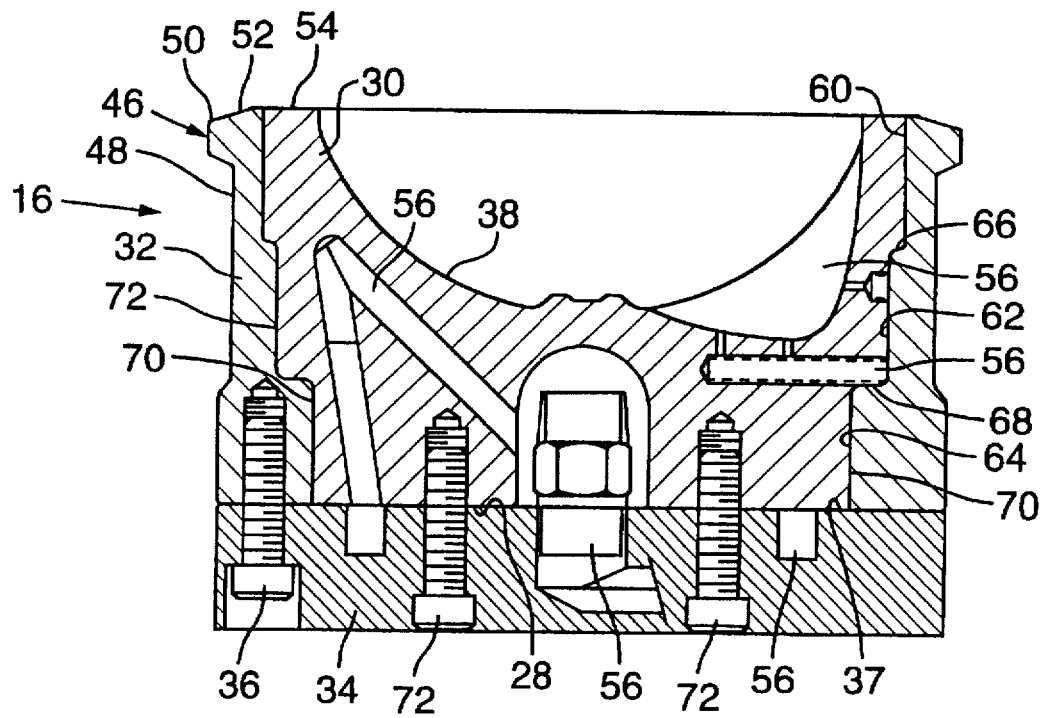
FIG. 4 is a schematic partially in section view of an alternate embodiment of the base assembly of the present invention.
Figure 5:
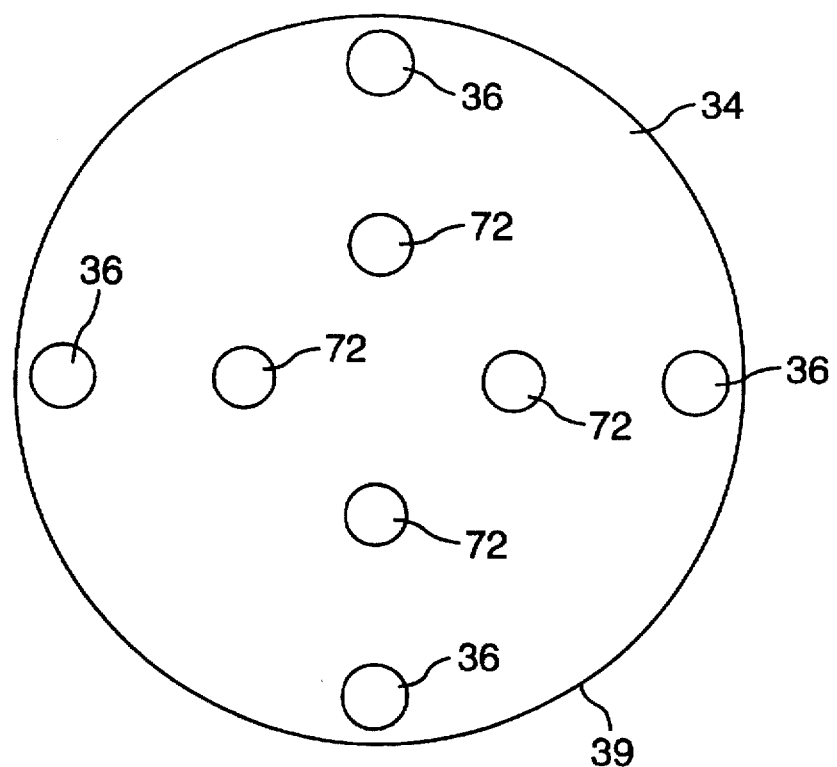
FIG. 5 is a bottom end view of the base assembly shown in FIG. 4.

Referring to FIGS. 4 and 5, another embodiment for the base assembly 16 of the present invention is shown. Like numbers to those used in FIGS. 2 and 3 are used and only the differences between the embodiments are described. The base insert 30 has upper, middle and lower annular side wall portions 60, 62, and 64, respectively. The lower annular side wall portion 64 is closer to the adaptor 34 than the upper annular side wall portion 60. The lower annular side wall portion 64 has a smaller diameter than the middle annular side wall portion 62 which in turn has a smaller diameter than the upper annular side wall portion 64. As a result stepped in recesses are provided at 66 and 68. The wear ring 32 has an inwardly stepped projecting lip portions 70 and 72 that fit into the recesses against the middle and lower annular side wall portions 62 and 64 such that the wear ring 32 is positioned to surround and to engage the upper, middle and lower annular side wall portions 60, 62, and 64. The threaded fasteners 36 pass through threaded apertures in the adaptor 34 and into threaded apertures in the wear ring 32 to secure the wear ring 32 to the adaptor 34. Additionally threaded fasteners 72 pass through threaded apertures in the adaptor 34 and into threaded apertures in the base insert 30 to secure the base insert to the adaptor.

It should be understood that in the embodiments shown in FIGS. 2 and 4 any number of flanges 44 or recessed stepped walls 66, 68 could be used to suitably protect and secure the base insert 30 relative to the wear ring 32.

Figure 6:
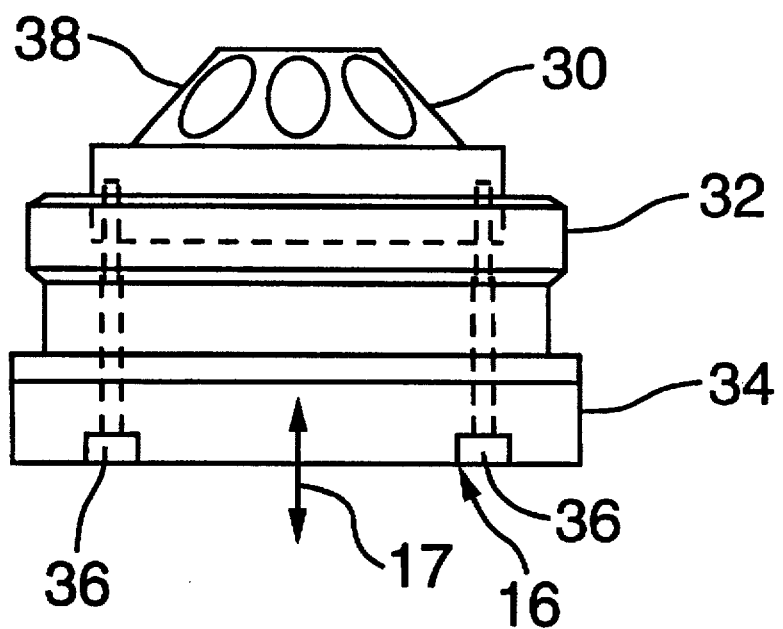
FIG. 6 shows an alternative embodiment of a push up insert.

Referring to FIG. 5, there is shown a base insert 16 that similar to the view of the base insert shown in FIG. 1. In FIG. 6, the embodiment shows the base insert upper surface 38 projecting beyond the wear ring 32 and having a generally convex shape with the mold face pattern cut out on surface 38. This form of base insert is commonly referred to as a "push up insert".

What is claimed is:

1. A base assembly for use as a part of a mold assembly for forming containers, said base assembly comprising:

an adaptor having an upper supporting surface, a base insert having a lower surface positioned on said upper supporting surface of said adaptor, said base insert having an upper surface contoured to the shape of a base of said container to be formed, said base insert having at least one annular side wall portion, and said base insert comprising a lightweight metallic material;

a wear ring having an inner annular surface surrounding and engaging said at least one annular side wall portion of said base insert, to protect said at least one annular side wall portion of said base insert, said wear ring comprising a hardened wear resistant metallic ring adapted to reinforce said base insert during formation of said container; and, a plurality of fasteners passing through the adaptor to positively locate and secure said base insert and said wear ring relative to said adaptor.

2. The base assembly of claim 1 wherein said wear ring is heat treated to be a hardened material.

3. The base assembly of claim 1 wherein the base insert has upper and lower annular side wall portions where the lower annular side wall portion is closer to the adaptor than the upper annular side wall portion, the lower annular side wall portion having a larger diameter than the upper annular side wall portion such that the lower annular side wall portion provides a stepped out peripheral flange upon which said wear ring is positioned such that said wear ring surrounds and engages the upper annular side wall portion, said fasteners passing through said adaptor and flange of said base insert into said wear ring to secure said adaptor, said base insert and said wear ring together with the peripheral flange of said base insert sandwiched between said wear ring and said adaptor.

4. The base assembly of claim 1 wherein the base insert has upper and lower annular side wall portions where the lower annular side wall portion is closer to the adaptor than the upper annular side wall portion, the lower annular side wall portion having a smaller diameter than the upper annular side wall portion such that the upper annular side wall portion provides a stepped in recess to said lower annular wall portion, said wear ring having an inwardly projecting lip portion that fits into said recess against said lower annular side wall portion such that said wear ring is positioned to surround arid to engage both the upper and the lower annular side wall portions, said fasteners passing through said adaptor and into said wear ring to secure said wear ring to said adaptor.

5. The base assembly of claim 4 further including additional fasteners passing through said adaptor and into said base insert to secure said base insert to said adaptor.

6. The base assembly of claim 1 wherein said fasteners are threaded and threadably engage threaded apertures in at least said wear ring.

7. The base assembly of claim 1 wherein said fasteners are evenly spaced adjacent to and around the periphery of said adaptor.

8. The base assembly of claim 1 wherein said insert is made from aluminum.

9. The base assembly of claim 1 wear ring and adaptor comprises steel.

10. The base assembly of claim 1 wherein said wear ring is slip fitted around base insert.

11. The base assembly of claim 1 wherein said wear ring has an outer wall portion that is adapted to co-operate with other mold parts of said mold assembly during formation of said container.

12. The base assembly of claim 11 wherein the outer wall of said wear ring is provided with a recessed groove and rim to co-operate with said other mold parts during formation of said container.

13. The base assembly of claim 12 wherein said rim has an upper edge that lies either flush to or below the upper edge of said base insert.

14. A light weight base assembly for use as a part of a mold assembly for forming containers, said base assembly comprising:

a generally cylindrical shaped flat steel adaptor having an upper supporting surface, a base insert having a lower surface positioned on said upper supporting surface of said adaptor, said base insert having an upper surface with a ledge surrounding a recessed contoured pattern in the base insert which pattern corresponds to a base of said container to be formed, said base insert having at least one annular side wall portion, and said base insert comprising a lightweight aluminum material;

a wear ring having an inner annular surface surrounding and engaging said at least one annular side wall portion of said base insert to protect said at least one annular side wall portion of said base insert, said wear ring comprising a hardened wear resistant steel ring adapted to reinforce said base insert during formation of said container; said wear ring further including an outer wall portion having a recessed groove and upper rim to co-operate with said other mold parts during formation of said container, and said rim having an upper edge that lies either flush with or below the upper ledge of said base insert; and, a plurality of fasteners passing through the adaptor to positively locate and secure said base insert and said wear ring relative to said adaptor.

15. The base assembly of claim 14 wherein the base insert has upper and lower annular side wall portions where the lower annular side wall portion is closer to the adaptor than the upper annular side wall portion, the lower annular side wall portion having a larger diameter than the upper annular side wall portion such that the lower annular side wall portion provides a stepped out peripheral flange upon which said wear ring is positioned such that said wear ring surrounds and engages the upper annular side wall portion, said fasteners passing through said adaptor and flange of said base insert into said wear ring to secure said adaptor, said base insert and said wear ring together with the peripheral flange of said base insert sandwiched between said wear ring and said adaptor.

16. The base assembly of claim 14 wherein the base insert has upper and lower annular side wall portions where the lower annular side wall portion is closer to the adaptor than the upper annular side wall portion, the lower annular side wall portion having a smaller diameter than the upper annular side wall portion such that the upper annular side wall portion provides a stepped in recess to said lower annular wall portion, said wear ring having an inwardly projecting lip portion that fits into said recess against said lower annular side wall portion such that said wear ring is positioned to surround arid to engage both the upper and the lower annular side wall portions, said fasteners passing through said adaptor and into said wear ring to secure said wear ring to said adaptor.

17. The base assembly of claim 16 further including additional fasteners passing through said adaptor and into said base insert to secure said base insert to said adaptor.

18. The base assembly of claim 14 wherein said fasteners are threaded and threadably engage threaded apertures in at least said wear ring.

19. The base assembly of claim 14 wherein said fasteners are spaced adjacent to and around the periphery of said adaptor.

20. The base assembly of claim 1 wherein said wear ring is heat treated to be a hardened material and is slip fitted around base insert.

* * * * *